US012649394B2

(12) United States Patent
Riad et al.

(10) Patent No.: US 12,649,394 B2
(45) Date of Patent: Jun. 9, 2026

(54) TRANSFORMABLE SEAT BACK FOR FORMING ARMRESTS

(71) Applicant: Rivian IP Holdings, LLC, Irvine, CA (US)

(72) Inventors: Yousuf Sedki Riad, Ostrander, OH (US); Ken Albert Louis Buttery, Mission Viejo, CA (US); Luis Miguel de Matos Isidoro, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 190 days.

(21) Appl. No.: 18/598,256

(22) Filed: Mar. 7, 2024

(65) Prior Publication Data

US 2025/0282268 A1 Sep. 11, 2025

(51) Int. Cl.
| | |
|---|---|
| *B60N 2/32* | (2006.01) |
| *B60N 2/30* | (2006.01) |
| *B60N 2/75* | (2018.01) |
| *B60N 3/00* | (2006.01) |
| *B60R 7/04* | (2006.01) |

(52) U.S. Cl.
CPC .............. *B60N 2/32* (2013.01); *B60N 2/3011* (2013.01); *B60N 2/757* (2018.02); *B60N 3/001* (2013.01); *B60R 7/043* (2013.01)

(58) Field of Classification Search
CPC . B60N 2/36; B60N 2/32; B60N 2/757; B60N 2/79; B60N 3/004; B60N 2/206; B60N 2205/35
See application file for complete search history.

(56) References Cited

U.S. PATENT DOCUMENTS

| | | | | |
|---|---|---|---|---|
| 5,669,665 A * | 9/1997 | Nowak | .................. | B60N 2/286 |
| | | | | 297/406 |
| 7,980,617 B2 * | 7/2011 | Brncick | ................... | B60N 2/99 |
| | | | | 296/64 |
| 9,586,686 B2 * | 3/2017 | Asli | ........................ | B64D 11/06 |
| 10,160,363 B2 * | 12/2018 | Aguilar Ruelas | ........ | B60N 2/26 |
| 10,232,747 B2 * | 3/2019 | Line | .......................... | B60N 2/32 |
| 10,457,170 B2 * | 10/2019 | Line | ........................ | B60N 3/004 |
| 11,052,794 B2 * | 7/2021 | Hunsaker | ................. | B60N 2/26 |
| 2004/0026951 A1 * | 2/2004 | Rudberg | ................... | B60N 2/36 |
| | | | | 296/65.09 |
| 2006/0255642 A1 * | 11/2006 | Epaud | .................... | B60N 2/753 |
| | | | | 297/411.38 |
| 2007/0052264 A1 * | 3/2007 | Lee | ....................... | B60N 2/3084 |
| | | | | 297/188.04 |
| 2014/0138999 A1 * | 5/2014 | Stesl | ...................... | B60N 2/366 |
| | | | | 297/378.12 |
| 2017/0368975 A1 * | 12/2017 | Miyawaki | .............. | B60N 2/682 |
| 2019/0275917 A1 * | 9/2019 | Kubota | .................. | B60N 2/206 |
| 2025/0033541 A1 * | 1/2025 | Krot | ....................... | B60N 2/309 |

* cited by examiner

Primary Examiner — Arfan Y. Sinaki
(74) *Attorney, Agent, or Firm* — HG LAW LLP

(57) ABSTRACT

Assemblies, components, and methods are presented herein for a transformable seat. The seat includes a seat back. The seat back incorporates a frame and frame is rotatably coupled at one end to a seat base. The frame at least partially defines an opening in the seat back and two panels are each rotatably coupled to respective sides of the frame.

18 Claims, 13 Drawing Sheets

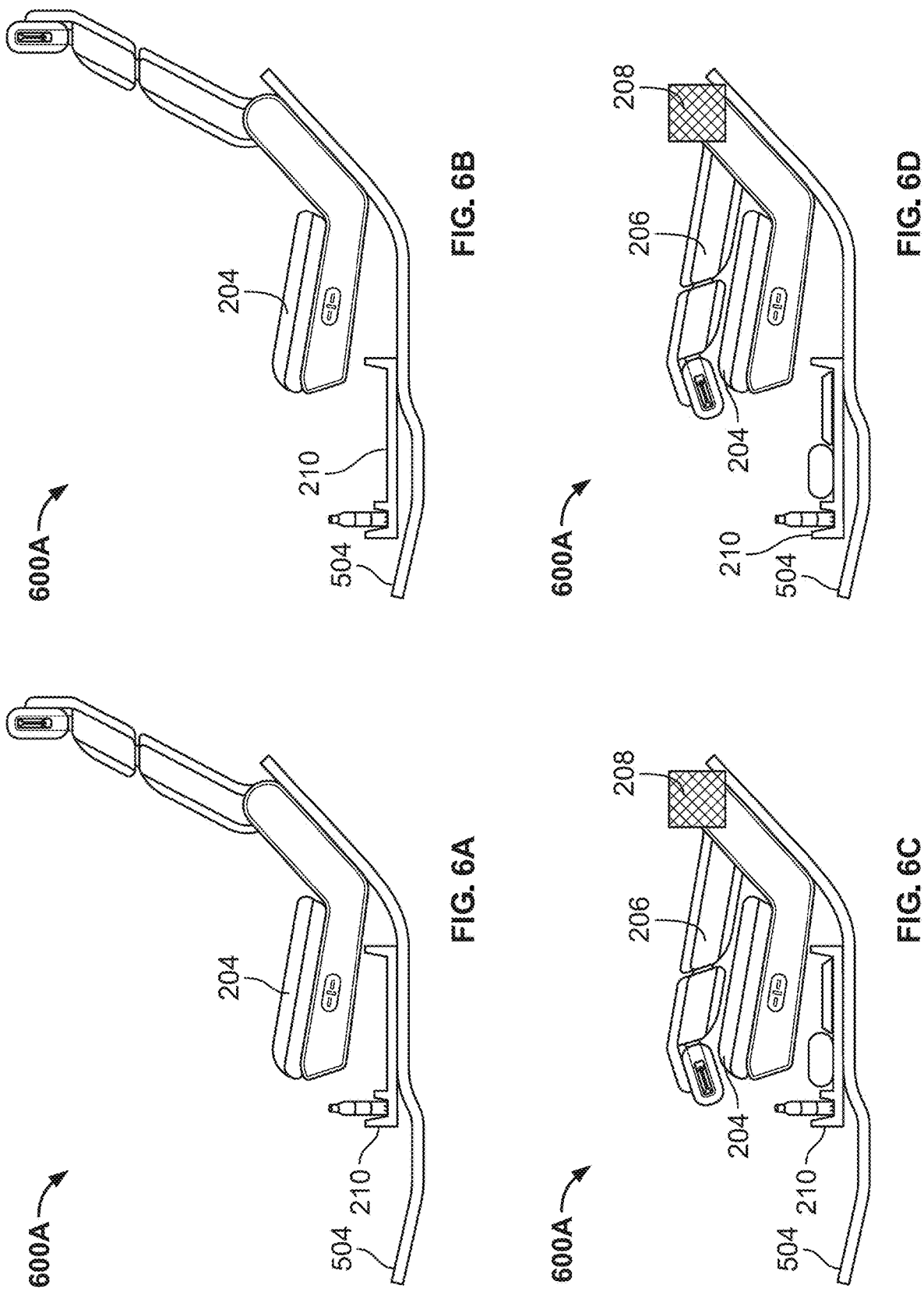

900

902 Rotatably articulate a top end of a frame of the seat back from an upright orientation to a folded down orientation via a hinge assembly at a bottom end of the frame 904 Rotate left and right panels about respective sides of the frame to expose an opening at least partially defined by the frame 906 Arrange a storage bin within the opening

TRANSFORMABLE SEAT BACK FOR FORMING ARMRESTS

INTRODUCTION

The present disclosure is directed to a seat that is capable of multiples uses and, more particularly, to a seat back of a passenger vehicle that is transformable into multiple configurations.

SUMMARY

There are a number of passenger seat configurations for vehicles. Certain known structures enable a middle seat back of a three passenger seat configuration to be turned into either an arm rest or a through opening. However, these configurations lack a means for providing a modifiable, or customizable, configurations by changing positions of a pair of panels that are integrated into a seat back.

The seat back of the present disclosure is formed out of a frame. The frame has a pair of panels rotatably coupled to sides of the frame. When the frame of the seat back is arranged horizontal to a seat base, the pair of panels can be rotated about the lateral sides of the frame to expose an opening (e.g., an opening to a storage volume) in the seat back, and the panels may comprise a padded surface to provide proper armrests to passengers seated on either lateral side of the seat back. In some embodiments, the panels can be adjusted to create a work surface.

In some embodiments, the frame is rotatably coupled to the seat base by a hinge assembly. The hinge assembly is configured to enable the seat back to rotate between an upright position and a folded position where the frame is arranged horizontally above the seat base.

In some embodiments, left and right detent features are arranged along respective sides of the frame for respective left and right panels (e.g., for ensuring the left and right panels remain in a fixed position once rotated to a desired configuration). When the left and right panels are in a closed position, the left and right panels cover the opening. When the seat back is arranged in an upright orientation and when the left and right panels are rotated outward about respective sides of the frame, the opening is exposed.

In some embodiments, when the seat back is in a folded down position and when the left and right panels are rotated outward to a first position, the left and right panels form respective armrests. Additionally, or alternatively, when the seat back is in a folded down position and when the left and right panels are rotated outward, the opening is capable of receiving a storage bin that is removably coupled to a perimeter of the opening. In some embodiments, when the seat back is in a folded down position and when the left and right panels are rotated outward to a second position, the left and right panels are horizontally arranged and form respective work surfaces.

In some embodiments, the seat back also includes a head rest rotatably coupled to a second end of the seat back arranged opposite the one end rotatably coupled to the seat base. Additionally, or alternatively, the frame is comprised of a plurality of tubular members fixedly attached to ends of each other.

In some embodiments, the disclosure is directed to a vehicle assembly. The vehicle assembly includes a vehicle cabin and a row of seats arranged within the vehicle cabin, the row of passenger seats comprise at least one seat back of this disclosure. In some embodiments, the row of seats comprises three seats. Additionally, or alternatively, the at least one seat back comprises a seat belt retractor coupled to the frame.

In some embodiments, the disclosure is directed to a method of transforming a seat back. A top end of a frame of the seat back is rotatably articulated from an upright orientation to a folded down orientation via a hinge assembly at a bottom end of the frame. Left and right panels are rotated about respective sides of the frame to expose an opening at least partially defined by the frame. Additionally, or alternatively, the method includes arranging a storage bin within the opening.

BRIEF DESCRIPTIONS OF THE DRAWINGS

The above and other objects and advantages of the disclosure may be apparent upon consideration of the following detailed description, taken in conjunction with the accompanying drawings, in which:

FIG. 6A illustrates a seat assembly with a removable storage area, in accordance with some embodiments of the disclosure;

FIG. 6B illustrates the seat assembly of FIG. 6A with the storage area pulled out of a base of the seat assembly, in accordance with some embodiments of the disclosure;

FIG. 6C illustrates the seat assembly of FIG. 6A in a folded configuration with a removable storage area, in accordance with some embodiments of the disclosure;

FIG. 6D illustrates the seat assembly of FIG. 6A in the folded configuration with the storage area pulled out of the base of the seat assembly, in accordance with some embodiments of the disclosure;

DETAILED DESCRIPTION

Methods, components, and assemblies are provided herein for a transformable seat. The transformable seat includes a seat back of a vehicle with a pair of rotatable panels which provide access to different seat configurations depending on the arrangement of the pair of rotatable panels relative to the seat back.

Figures 1A, 1B:
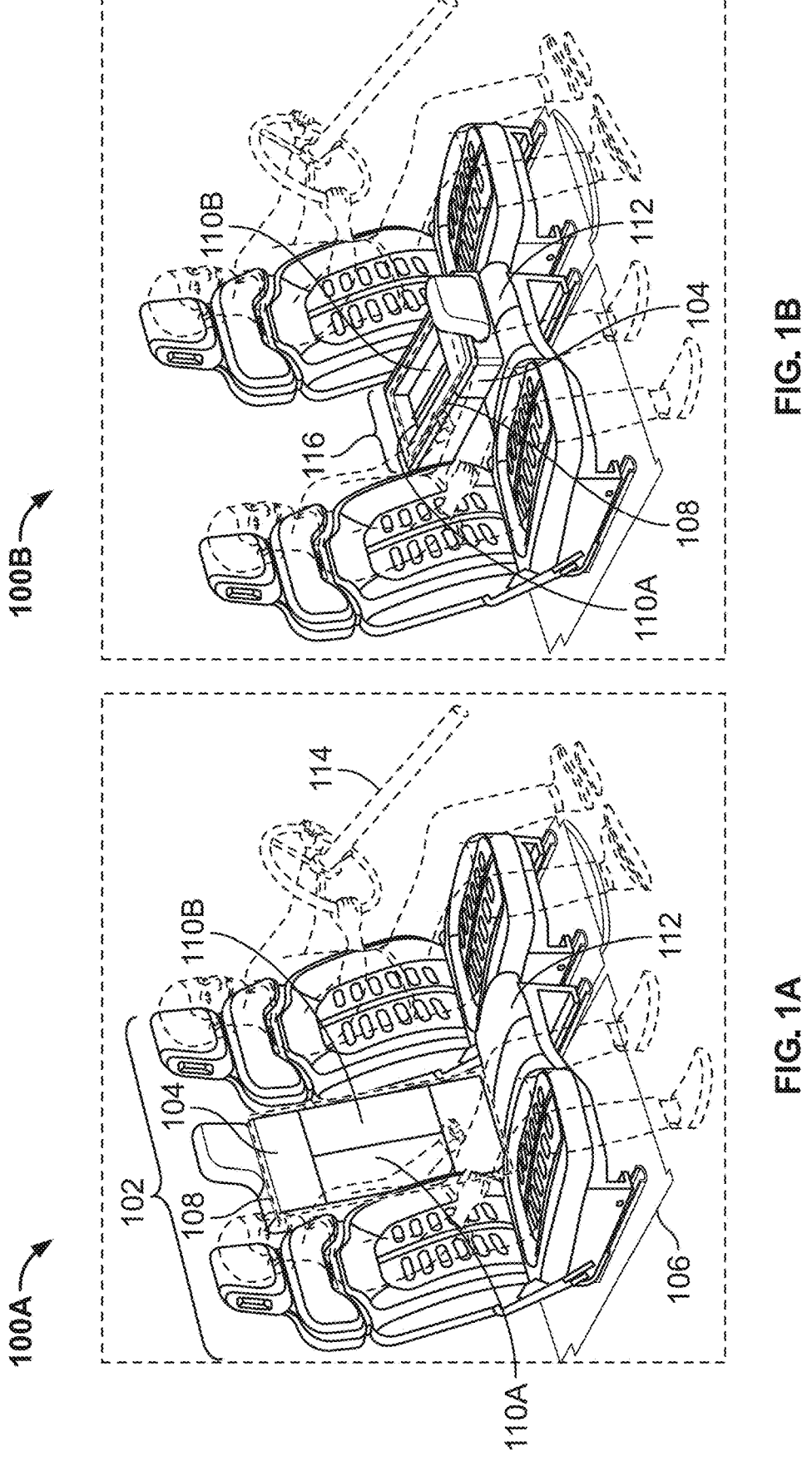
FIG. 1A illustrates a vehicle cabin with a row of seats including an exemplary seat back, in accordance with some embodiments of the disclosure.
FIG. 1B illustrates a vehicle cabin with a row of seats including an exemplary seat in a folded configuration, in accordance with some embodiments of the disclosure.

FIG. 1A depicts vehicle cabin 100A of a vehicle assembly with row of seats 102 comprising seat back 104, in accordance with some embodiments of the disclosure. Vehicle cabin 100A may include or incorporate any or all elements depicted in, or described in reference to, FIGS. 1B-8. One or more elements of vehicle cabin 100A may be manipulated or adjusted based on one or more elements of process 900 of FIG. 9.

In some embodiments, vehicle cabin 100A is considered a passenger or occupant portion of a vehicle (e.g., a vehicle assembly). For example, steering column assembly 114 is arranged in front of an end seat of row of seats 102 to enable an occupant of a vehicle comprising vehicle cabin 100A to steer the vehicle. Secured, or adjustably secured, to cabin floor 106 is row of seats 102. Row of seats 102 as shown in FIGS. 1A-1D comprises three passenger seats. Row of seats 102 may comprise any of a pair of seats, a plurality of seats, or a single seat. Row of seats 102 may be considered one or more of a front row of passenger seats, a middle row of passenger seats, or a rear row of passenger seats. A middle seat of the three passenger seats includes seat back 104. In some embodiments, seat back 104 is incorporated into either or both of the two end seats. In some embodiments, seat back 104 is incorporated into one or more of the passenger seats of row of seats 102. Seat back 104 comprises frame 108, which at least partially defines an opening in seat back 104. The opening is covered in FIG. 1A by left panel 110A and right panel 110B as the panels are arranged in FIG. 1A in a closed position relative to seat back 104. Left panel 110A is rotatably coupled to a left side of frame 108. Right panel 110B is rotatably coupled to a right side of frame 108. Frame 108 is rotatably coupled at one end to seat base 112. For example, a hinge assembly with multiple detent features for multiple angles may be incorporated into the middle seat of FIG. 1A to enable seat back 104 to be articulated from an upright position to a folded position along seat base 112. In some embodiments, frame 108 is rotatably coupled to seat base 112 by one or more of an actuator or a radial spring mechanism. Left panel 110A and right panel 110B can be rotated outwards around sides of frame 108 to expose an opening when seat back 104 is arranged in the upright position of FIG. 1A.

FIG. 1B depicts vehicle cabin 100B with seat back 104 arranged in a folded configuration such that seat back 104 extends along seat base 112, in accordance with some embodiments of the disclosure. Vehicle cabin 100B may include or incorporate any or all elements depicted in, or described in reference to, FIGS. 1A, and 1C-8. One or more elements of vehicle cabin 100B may be manipulated or adjusted based on one or more elements of process 900 of FIG. 9.

Vehicle cabin 100B incorporates all the elements shown in and described in reference to FIG. 1A. Frame 108, as described in reference to FIG. 1A, is rotatably coupled to seat base 112 such that seat back 104 articulates, or rotates about a hinge assembly, between the upright position shown in FIG. 1A and the folded position depicted in FIG. 1B. The folded position of seat back 104 includes frame 108 being arranged horizontally above seat base 112. Frame 108 also defines opening 116. Opening 116 is covered on one side of frame 108 by left panel 110A and right panel 110B. As shown in FIG. 1B, frame 108 forms a recess between rear surfaces of left panel 110A and right panel 110B when seat back 104 is arranged in the folded position.

Figures 1C, 1D:
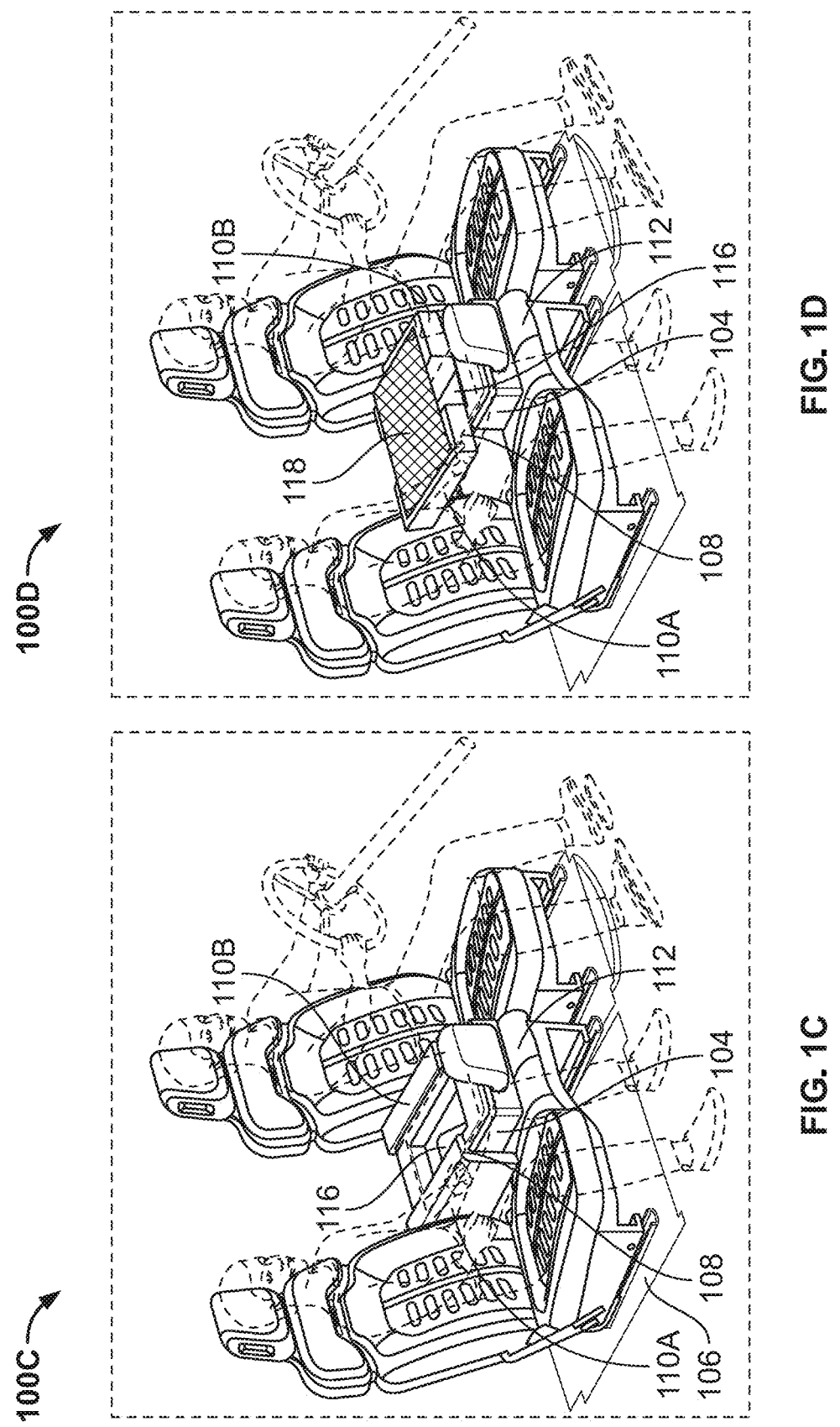
FIG. 1C illustrates a vehicle cabin with a row of seats including an exemplary seat back with access to an opening, in accordance with some embodiments of the disclosure.
FIG. 1D illustrates a vehicle cabin with a row of seats including an exemplary seat back manipulated to create a platform, in accordance with some embodiments of the disclosure.

FIG. 1C depicts vehicle cabin 100C where seat back 104 is in the folded position with opening 116 extending all the way through seat back 104 based on the position of left panel 110A and right panel 110B, in accordance with some embodiments of the disclosure. Vehicle cabin 100C may include or incorporate any or all elements depicted in, or described in reference to, FIGS. 1A, 1B, and 1D-8. One or more elements of vehicle cabin 100C may be manipulated or adjusted based on one or more elements of process 900 of FIG. 9.

Vehicle cabin 100C incorporates all the elements shown in and described in reference to FIGS. 1A and 1B. Seat back 104 is in the folded position described in reference to FIG. 1B. Left panel 110A and right panel 110B are rotated outwards about sides of frame 108. As a result, opening 116 provides access all the way through seat back 104 such that access to a storage area is provided to an occupant of vehicle cabin 100C. In some embodiments, the storage area ends at the top surface of seat base 112. In some embodiments, the storage area may be extended to cabin floor 106 based on manipulation of seat base 112 (e.g., removing or articulating a seat cushion to expose more space for storing items through opening 116). As shown in FIG. 1C, left panel 110A has an elevated padded structure in this depicted orientation. This elevated padded structure forms a first armrest. Left panel 110B also has an elevated padded structure in the depicted orientation. This second elevated padded structure forms a second armrest arranged on a side of frame 108 opposite the first armrest. In some embodiments, opening 116 is configured to receive a storage bin that is removably coupled to a perimeter of opening 116 (e.g., as at least partially defined by frame 108).

FIG. 1D depicts vehicle cabin 100D where seat back 104 is manipulated to create platform 118, in accordance with some embodiments of the disclosure. Vehicle cabin 100D may include or incorporate any or all elements depicted in, or described in reference to, FIGS. 1A-1C and 2A-8. One or more elements of vehicle cabin 100D may be manipulated or adjusted based on one or more elements of process 900 of FIG. 9.

Vehicle cabin 100D incorporates all the elements shown in and described in reference to FIGS. 1A-1C. Seat back 104 is in the folded position described in reference to FIGS. 1B and 1C. Left panel 110A and right panel 110B are rotated outwards about sides of frame 108 beyond the rotation required to result in the configuration of FIG. 1C. As a result, surfaces of left panel 110A and right panel 110B meet over opening 116 to create platform 118. In some embodiments, platform 118 is not a single work surface formed by ends of surfaces of left panel 110A and right panel 110B contacting over opening 116. As a result, platform 118 may comprise two separate work surfaces when respective portions of left panel 110A and right panel 110B are arranged horizontally (e.g., with respect to seat base 112). For example, the respective work surfaces may be adjusted towards or away from each other to remove or provide access to opening 116, and a storage volume accessible via opening 116.

Figure 2B:
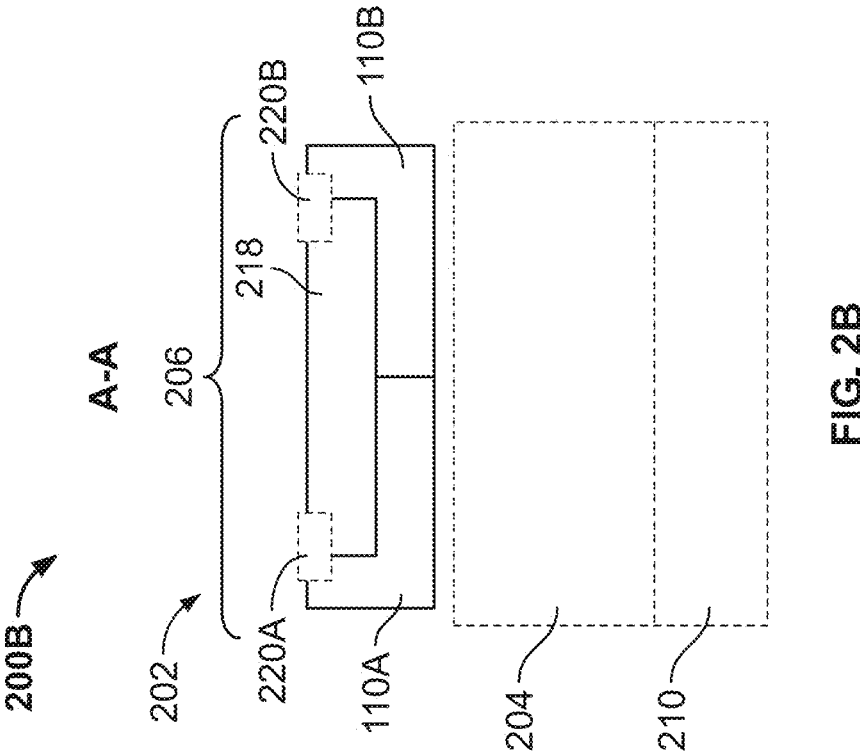
FIG. 2B illustrates a cross sectional view of the seat of FIG. 2A in folded configuration, in accordance with some embodiments of the disclosure.
Figure 2A:
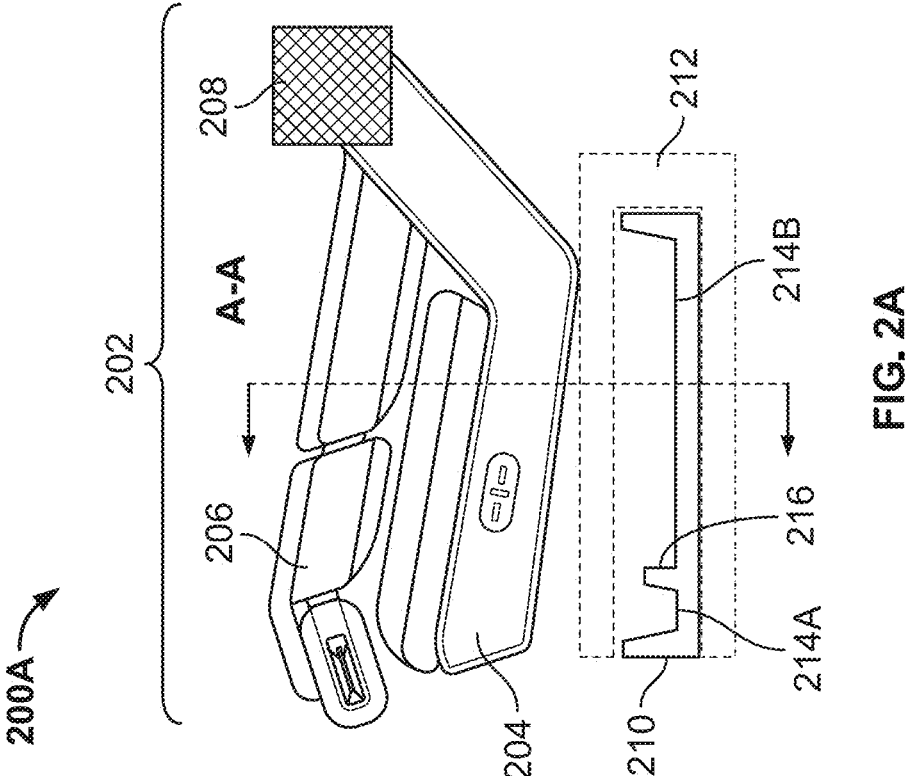
FIG. 2A illustrates a side view of an exemplary seat in a folded configuration, in accordance with some embodiments of the disclosure.

FIG. 2A depicts side view 200A of seat assembly 202 in a folded configuration, in accordance with some embodiments of the disclosure. Seat assembly 202 may include or incorporate any or all elements depicted in, or described in reference to, FIGS. 1A-1D and 2B-8. One or more elements of seat assembly 202 may be manipulated or adjusted based on one or more elements of process 900 of FIG. 9.

Seat assembly 202 includes seat base 204. Seat back 206 is rotatably coupled to seat base 204 via hinge assembly 208. Hinge assembly 208 comprises any suitable apparatus or assembly for enabling seat back 206 to articulate between an upright position (e.g., suitable for accommodating a seat vehicle occupant on seat base 204) and the horizontal or folded position depicted in FIG. 2A. Seat back 206 includes a pair of panels rotatably coupled to sides of a frame, which are each shown in more detail in FIGS. 2B-2E. Arranged below seat base 204 is storage component 210. Storage component 210 may be a tray or other removeable volume for accommodating one or more devices or objects of a vehicle occupant. For example, storage component 210 may be removably attached or slidably attached to seat frame 212. Seat frame 212 corresponds to any component, assembly, subassembly, or interface that enables seat assembly 202 to be secured, or adjustably secured, to a surface of a floor of a vehicle cabin (e.g., cabin floor 106 of FIG. 1A). Storage component 210 is divided into storage areas 214A and 214B by storage divider 216. Storage divider 216 may comprise any suitable structural configuration to prevent one or more of objects, devices, or components stored in storage areas 214A and 214B from contacting each other while a vehicle assembly comprised of seat assembly 202 is moving.

FIG. 2B depicts cross sectional view 200B of seat assembly 202 in a folded configuration, in accordance with some embodiments of the disclosure. Seat assembly 202 may include or incorporate any or all elements depicted in, or described in reference to, FIGS. 1A-2A and 2C-8. One or more elements of seat assembly 202 may be manipulated or adjusted based on one or more elements of process 900 of FIG. 9.

Cross sectional view 200B depicts seat assembly 202 along cross section A-A from FIG. 2A. Seat back 206 is comprised of left panel 110A and right panel 110B. Left panel 110A and right panel 110B are rotatably coupled to frame 218 (e.g., corresponding to frame 108 of FIGS. 1A-1D). In some embodiments, frame 218 comprises one or more detent features on each lateral side to enable articulation of left panel 110A and right panel 110B into the varying positions of this disclosure (e.g., as shown in and described in reference to FIGS. 1A-1D). For example, detent features 220A and 220B are shown as interfacing with both frame

218 and respective panels. Detent feature 220A enables left panel 110A to rotatably articulate about a first side of frame 218 as shown in FIGS. 2B-2E for different configurations, or arrangements, corresponding to different secured, or locked, positions of left panel 110A relative to the first side of frame 218. Detent features 220B enable right panel 110B to rotatably articulate about a second side of frame 218 as shown in FIGS. 2B-2E for different configurations, or arrangements, corresponding to different secured, or locked, positions of right panel 110B relative to the second side of frame 218. Detent features 220A and 200B may be one or more of an extension, a recess, a locking feature, a releasing feature, or interface that enables each of left panel 110A and right panel 110B to be articulated, or manipulated, around respective sides of frame 218.

Figure 2D:
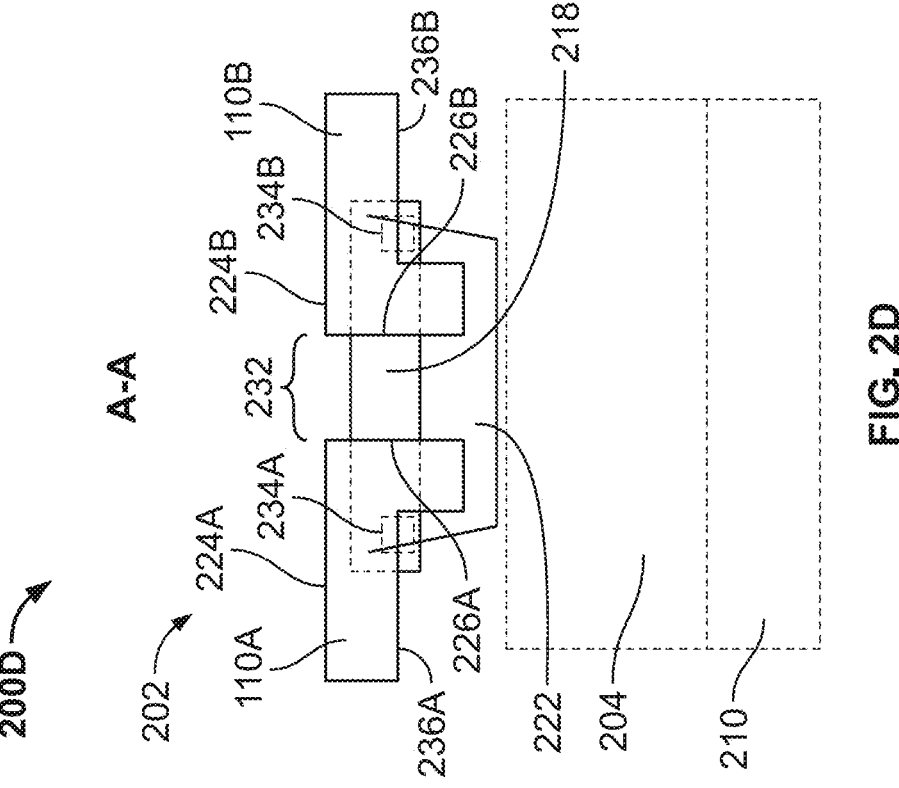
FIG. 2D illustrates a cross sectional view of the seat of FIG. 2A in a folded configuration where the seat back is manipulated to create a platform, in accordance with some embodiments of the disclosure.
Figure 2C:
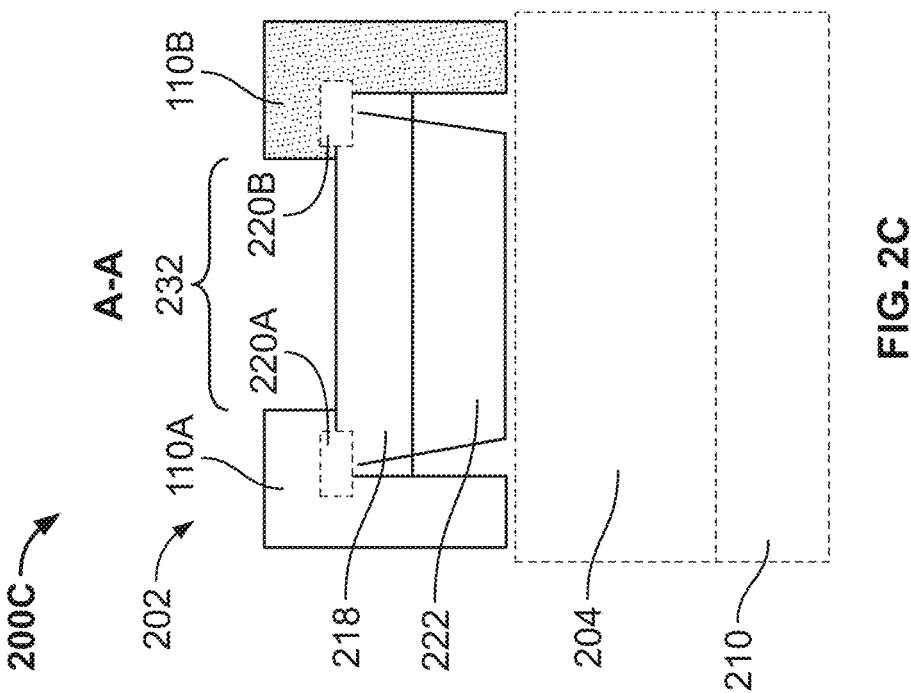
FIG. 2C illustrates a cross sectional view of the seat of FIG. 2A in a folded configuration with access to an opening, in accordance with some embodiments of the disclosure.

FIG. 2C depicts cross sectional view 200C of seat assembly 202 in a folded configuration with access to opening 116, in accordance with some embodiments of the disclosure. Seat assembly 202 may include or incorporate any or all elements depicted in, or described in reference to, FIGS. 1A-2B and 2D-8. One or more elements of seat assembly 202 may be manipulated or adjusted based on one or more elements of process 900 of FIG. 9.

Cross sectional view 200C depicts seat assembly 202 along cross section A-A from FIG. 2A. As shown in FIG. 2C, detent feature 220A is used to arrange left panel 110A such that opening 232 of frame 218 is at least partially accessible or exposed. Detent feature 220B is used to arrange right panel 110B in a similar fashion relative to frame 218 to at least partially expose, or create access to, opening 232. Arranged within opening 232 is storage volume 222. In some embodiments, storage volume 222 is removably attached (e.g., at one or more of a flange, a lip, or one or more extensions) to a perimeter of frame 218. In some embodiments, storage volume 222 is a collapsible structure. For example, storage volume 222 may be part of, or configured to be arranged within, storage compartment 210 prior to arrangement within opening 232. Detent features 220A and 220B may be the same features used in FIG. 2A to achieve the arrangement of left panel 110A and right panel 110B. In some embodiments, the detent features of FIG. 2A may be different than the detent features of FIG. 2B. Panel surfaces 226A and 226B can be considered armrests in FIG. 2C. Additionally, or alternatively, padding may be integrated into panel surfaces 226A and 226B for comfort of occupants of a vehicle comprising seat assembly 202.

FIG. 2D depicts cross sectional view 200D of seat assembly 202 in a folded configuration where left panel 110A and right panel 110B are manipulated to create work surfaces 224A and 224B that, when pushed together, can form a platform, in accordance with some embodiments of the disclosure. Seat assembly 202 may include or incorporate any or all elements depicted in, or described in reference to, FIGS. 1A-2C and 2E-8. One or more elements of seat assembly 202 may be manipulated or adjusted based on one or more elements of process 900 of FIG. 9.

Cross sectional view 200D depicts seat assembly 202 along cross section A-A from FIG. 2A. As shown in FIG. 2D, detent feature 234A is used to arrange left panel 110A such that opening 232 of frame 218 is at least partially accessible or exposed. Detent feature 234B is used to arrange right panel 110B in a similar fashion relative to frame 218 to at least partially expose, or create access to, opening 232. Arranged within opening 232 is storage volume 222. In some embodiments, storage volume 222 is removably attached (e.g., at one or more of a flange, a lip, or one or more extensions) to a perimeter of frame 218. In some embodiments, one or more of detent features 234A and 234B may be used to arrange storage volume 222 to be removably coupled to frame 218 at a perimeter of frame 218. When left panel 110A and right panel 110B are arranged as shown in FIG. 2D, work surfaces 224A and 224B are accessible. In some embodiments, work surfaces 224A and 224B can be pushed together such that panel surfaces 226A and 226B are touching. Accordingly, a platform may be formed (e.g., platform 118). As shown in FIG. 2D, panel surfaces 236A and 236B extend below a top surface of frame 218 when left panel 110A and 110B are manipulated, or articulated, to expose work surfaces 224A and 224B. In some embodiments, panel surfaces 236A and 236B may be arranged above a top surface of frame 218.

Figure 2E:
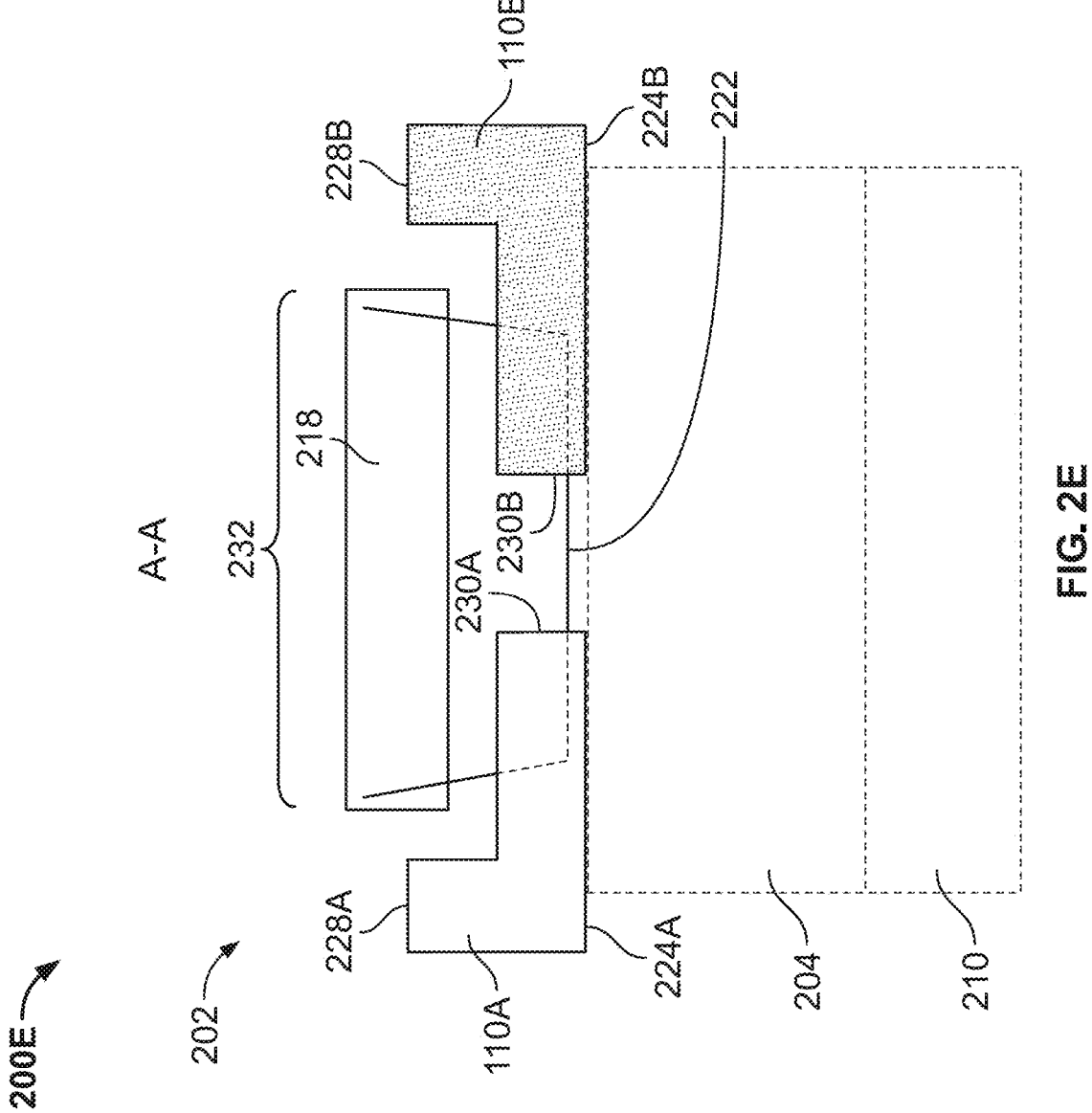
FIG. 2E illustrates a cross sectional view of the seat of FIG. 2A in a folded configuration with access to an opening, in accordance with some embodiments of the disclosure.

FIG. 2E illustrates a cross sectional view of the seat of FIG. 2A in a folded configuration with access to an opening, in accordance with some embodiments of the disclosure. Seat assembly 202 may include or incorporate any or all elements depicted in, or described in reference to, FIGS. 1A-2D and 3-8. One or more elements of seat assembly 202 may be manipulated or adjusted based on one or more elements of process 900 of FIG. 9.

Cross sectional view 200E depicts seat assembly 202 along cross section A-A from FIG. 2A. As shown in FIG. 2E, a seat back comprising frame 218, left panel 110A, and right panel 110B is arrange in a folded down position such that frame 218 extends along seat base 204. Left panel 110A and right panel 110B are rotated outward relative to frame 118 such that both of work surfaces 224A and 224B are aligned with a top surface of seat base 204. In this arrangement of panels, opening 232 is fully exposed such that opening 232 is capable of receiving storage volume 222 (e.g., a storage bin or collapsible storage volume). As described in reference to FIGS. 2C-2E, storage volume 222 is removably coupled to a perimeter of opening 232 that is part of frame 218. Panel surfaces 228A and 228B may be utilized as arm rests for occupants of a vehicle comprised of seat assembly 202 when left panel 110A and right panel 110B are arranged as shown in FIG. 2E. In some embodiments, panel surfaces 230A and 230B may be pushed towards each other until they contact each other to create a smaller volume of storage within frame 218 (e.g., as shown in FIG. 1B).

Figure 3:
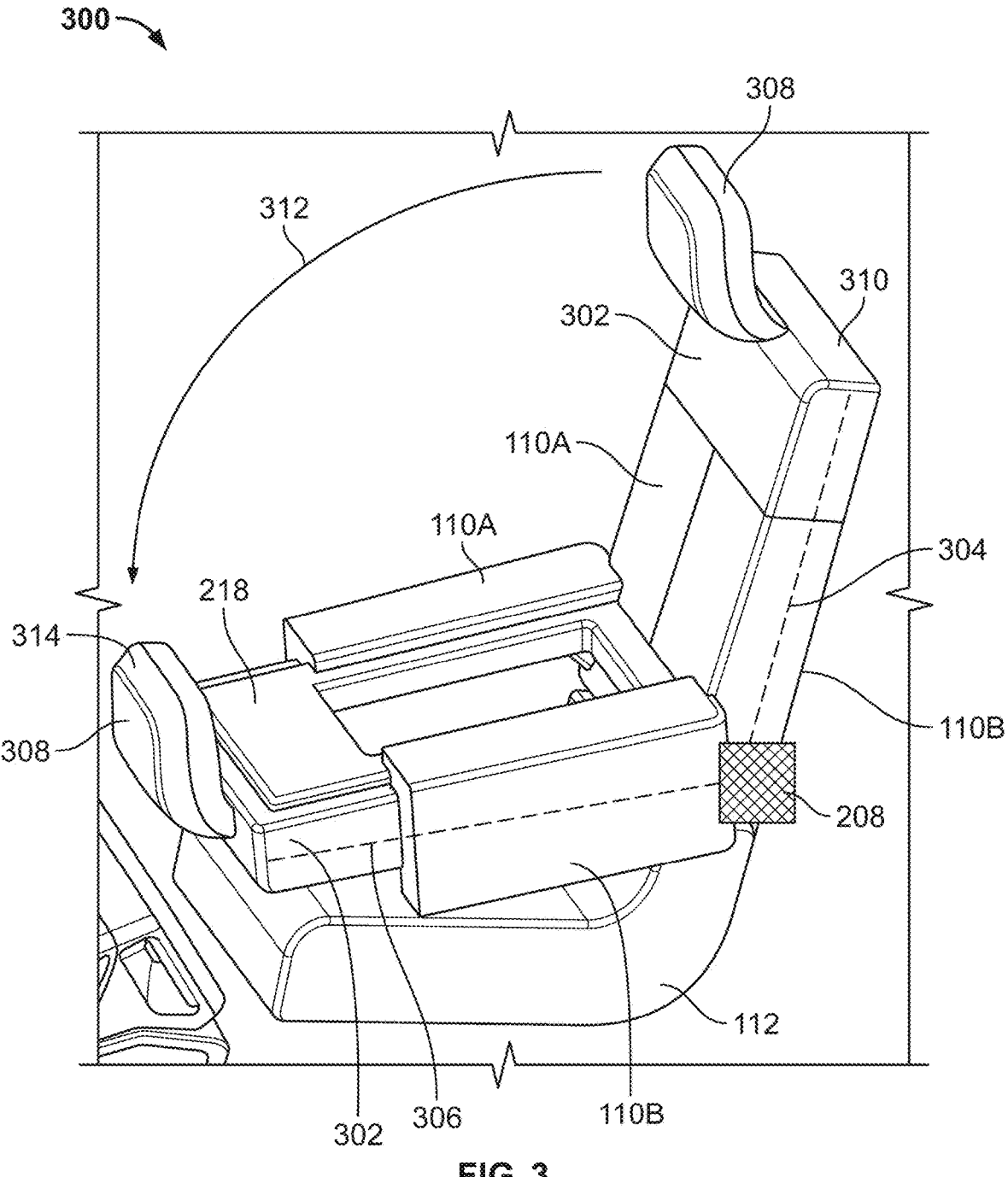
FIG. 3 illustrates a seat with a seat back in an upright position and the seat back being manipulated such that the seat is in a folded configuration, in accordance with some embodiments of the disclosure.

FIG. 3 depicts seat assembly 300 in a first configuration with seat back 302 arranged to align with upright alignment 304 and seat assembly 300 in a second configuration with seat back 302 arranged in to align with folded alignment 306, in accordance with some embodiments of the disclosure. Seat assembly 300 may include or incorporate any or all elements depicted in, or described in reference to, FIGS. 1A-2E and 4-8. One or more elements of seat assembly 300 may be manipulated or adjusted based on one or more elements of process 900 of FIG. 9.

Seat assembly 300 is comprised of seat back 302, which is rotatably coupled to seat base 112 via hinge assembly 208. Headrest 308 is coupled to top end 310 of seat back 302 and can be rotatably articulated relative to top end 310. For example, after seat back 302 is articulated about hinge assembly 208 relative to seat base 112 from upright alignment 304 to folded alignment 306 along seat back articulation path 312, headrest 308 can be manipulated such that headrest top 314 remains above seat back 302. Headrest 308 is arranged on seat back 302 at top end 310, which is arranged opposite the end of seatback 302 rotatably coupled via hinge assembly 208 to seat base 112. Headrest 308 may be manipulated to prevent longer items stored along seat base 112 from sliding. When seat back 302 is aligned with folded alignment 306 (e.g., a folded down position), left panel 110A and right panel 110B are shown in FIG. 3 as being rotated outward relative to respective sides of frame 218. This exposes an opening in which a storage bin can be removably inserted (e.g., at a perimeter of the opening).

Figure 4:
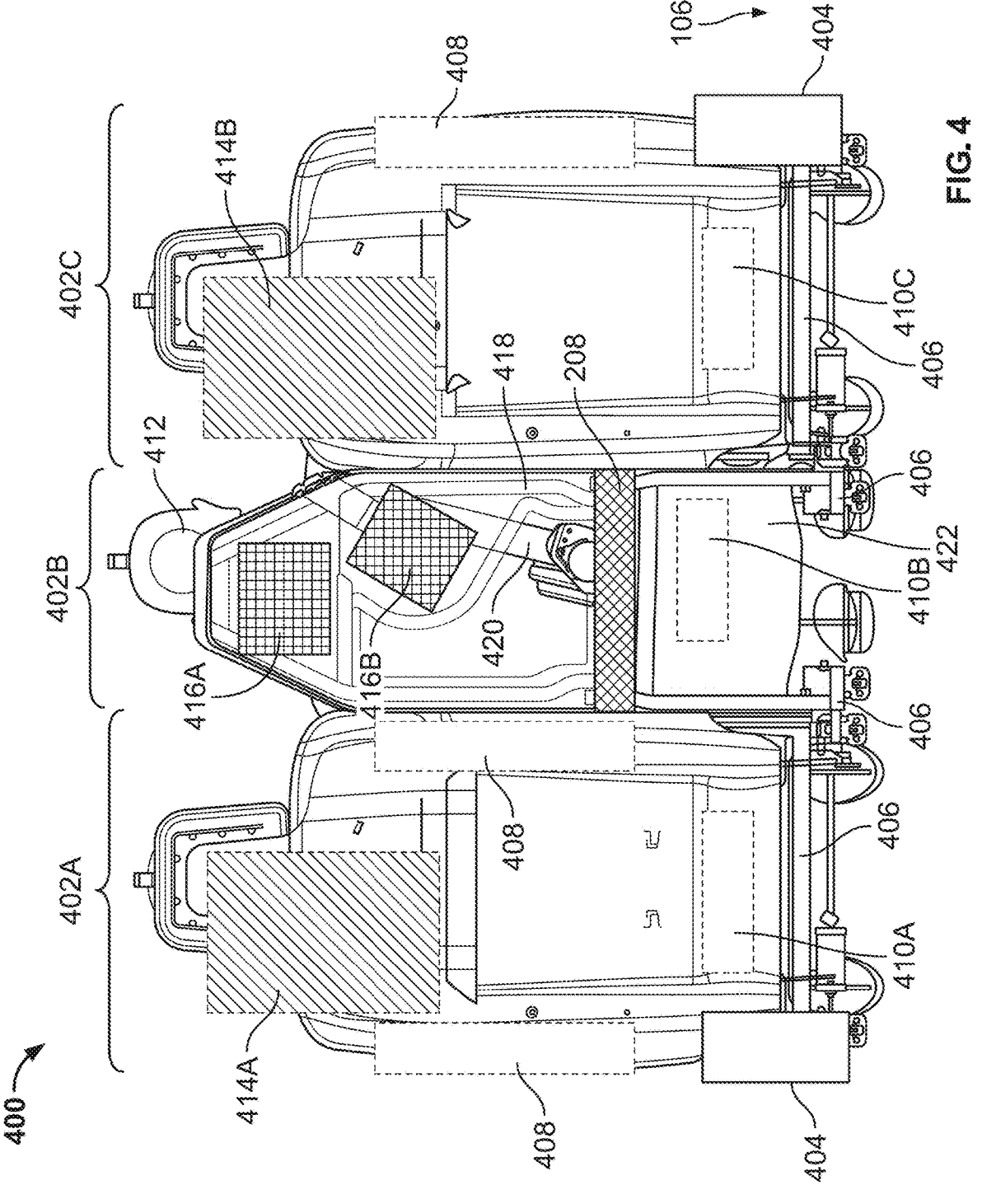
FIG. 4 illustrates a rear view of a seat assembly of this disclosure, in accordance with some embodiments of the disclosure.

FIG. 4 depicts a rear view of seat assembly 400, in accordance with some embodiments of the disclosure. Seat assembly 400 may include or incorporate any or all elements depicted in, or described in reference to, FIGS. 1A-3 and 5-8. One or more elements of seat assembly 400 may be manipulated or adjusted based on one or more elements of process 900 of FIG. 9.

Seat assembly 400 comprises seats 402A-C. Seats 402A and 402C incorporate outer seat anchors 404 for securing seats 402A-C to seat frame 406. Seat frame 406 is fixedly attached to cabin floor 106. Airbags 408 are arranged towards the ends of seat assembly 400, with an additional airbag 408 arranged between seat 402A and seat 402B. Arranged towards a base of each of seats 402A-C is an occupant classification circuitry, represented by occupant classification circuitries 410A-C, respectively. Each of occupant classification circuitries comprise one or more sensors for collecting data regarding an occupant of each respective seat. For example, occupant 412 is depicted as sitting in seat 402B. Accordingly, occupant classification circuitry 410B is configured to collected data related to occupant 412. Arranged towards tops of seats 402A and 402C are seatbelt retractors 414A and 414B. Seatbelt retractor 414A may be communicatively coupled to occupant classification circuitry 410A such that seatbelt retractor 414A is configured to perform locking actions based on one or more characteristics of an occupant of seat 402A. Seatbelt retractor 414B may be communicatively coupled to occupant classification circuitry 410C such that seatbelt retractor 414B is configured to perform locking actions based on one or more characteristics of an occupant of seat 402C. Regarding seat 402B with occupant 412, seat back 418 is rotatably coupled to seat base 422 via hinge assembly 208. Arranged above hinge assembly 208 is seatbelt 420. Seatbelt 420 may have a length adjusted relative to occupant 412 based on one or more of retractor 416A or retractor 416B, depending on an expected weight corresponding to occupant 412. One or more of retractor 416A or retractor 416B may be communicatively coupled to occupant classification circuitry 410B in order to guide length restrictions or adjustments of seatbelt 420 based on length modification accomplished via one or more of retractor 416A or retractor 416B. Retractors 416A and 416B are coupled to a frame of seatback 418.

Figure 5:
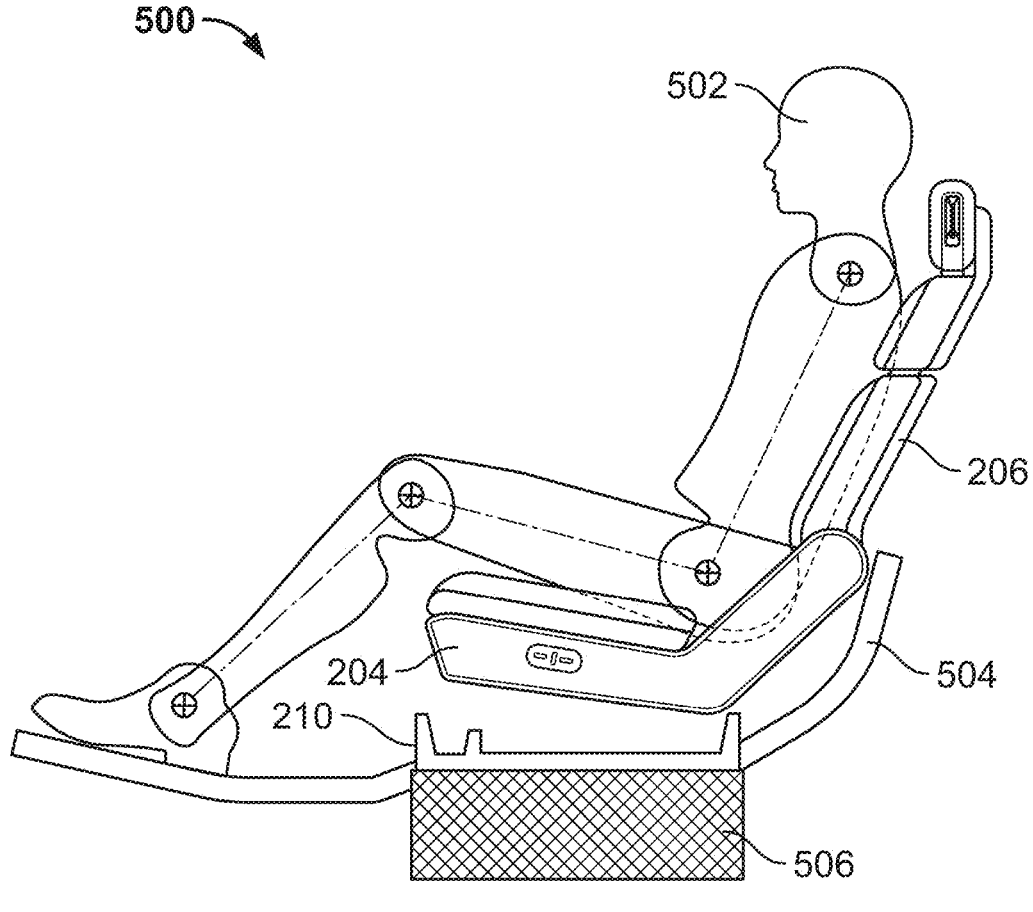
FIG. 5 illustrates a seat assembly with a temperature-controlled storage area, in accordance with some embodiments of the disclosure.

FIG. 5 depicts seat assembly 500 with temperature-controlled storage area comprised of storage compartment 210, in accordance with some embodiments of the disclosure. Seat assembly 500 may include or incorporate any or all elements depicted in, or described in reference to, FIGS. 1A-4 and 6A-8. One or more elements of seat assembly 500 may be manipulated or adjusted based on one or more elements of process 900 of FIG. 9.

Scat assembly 500 comprises seat back 206 and seat base 204. Seat assembly 500 is configured to support occupant 502. Arranged below seat base 204 is storage compartment 210. Occupant compartment surface 504 supports storage compartment 210 and seat assembly 500. Interfacing with occupant compartment surface 504 and storage compartment 210 is temperature control circuitry 506. Temperature control circuitry 506 is configured to regulate a temperature of one or more of storage compartment 210 and seat base 204. For example, temperature control circuitry 506 may be configured to modify conditions within storage compartment 210 such that storage compartment 210 maintains an elevated temperature for keeping food or items warm or a reduced temperature for avoiding food from becoming too warm for consumption. Temperature control circuitry 506 may be communicatively coupled to a remote personal device or an occupant interface of a vehicle comprising seat assembly 500.

FIG. 6A depicts seat assembly 600A with removable storage area comprising storage compartment 210 partially extending beyond a front edge of seat base 204, in accordance with some embodiments of the disclosure. Seat assembly 600A may include or incorporate any or all elements depicted in, or described in reference to, FIGS. 1A-5 and 6B-8. One or more elements of seat assembly 600A may be manipulated or adjusted based on one or more elements of process 900 of FIG. 9. Removable storage area 602 corresponds to storage component 210 of FIG. 2A.

FIG. 6B depicts seat assembly 600A with removable storage area comprising storage compartment 210 pulled out from under seat base 204, in accordance with some embodiments of the disclosure.

FIG. 6C depicts seat assembly 600A in a folded configuration with removable storage area comprising storage compartment 210 partially extending beyond a front edge of seat base 204, in accordance with some embodiments of the disclosure. For example, at least one detent feature that extends from or interfaces with occupant compartment surface 504 may be used to secure storage compartment 210 at different extension lengths relative to seat base 204. Accordingly, a front portion of storage compartment 210 comprises a cup holder. Seat assembly 600A achieves the depicted folded configuration as seat back 206 is rotatably coupled to seat base 204 via hinge assembly 208. In some embodiments, a top of seat back 206 is configured to serve as one or more of an armrest, a platform, one or more work surfaces, or a storage area access threshold.

FIG. 6D depicts seat assembly 600A in the folded configuration with removable storage area pulled out from under seat base 204, in accordance with some embodiments of the disclosure.

Figure 7A:
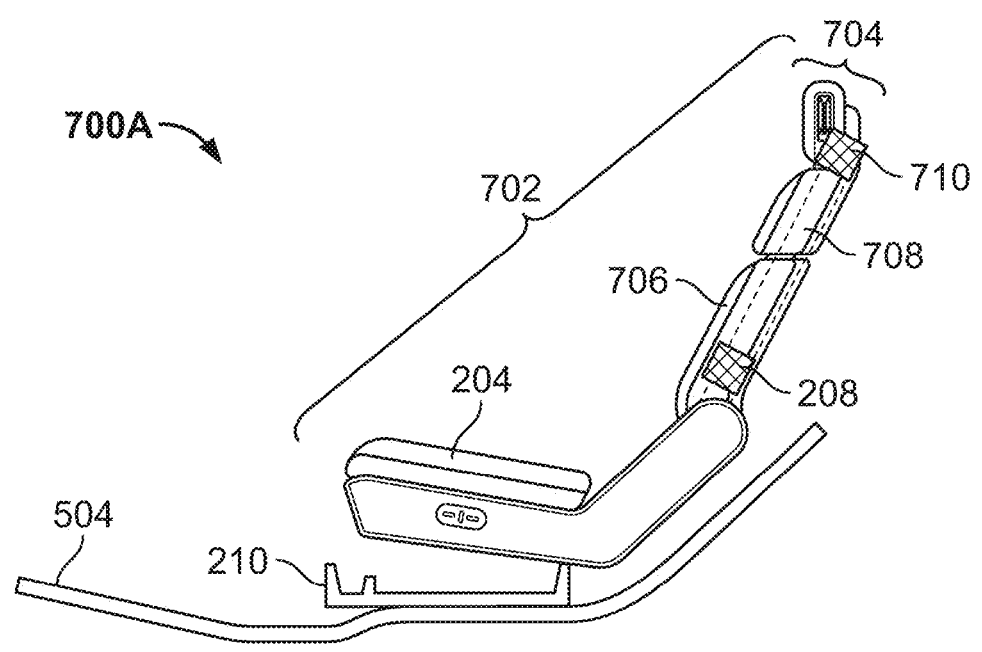
FIG. 7A illustrates a seat assembly with a seat back that has a padded panel interfacing with a seat back frame, in accordance with some embodiments of the disclosure.

FIG. 7A depicts seat assembly 702 in configuration 700A with seat back 704 that has padded panel 706 interfacing with seat back frame 708, in accordance with some embodiments of the disclosure. Seat assembly 702 may include or incorporate any or all elements depicted in, or described in reference to, FIGS. 1A-6D and 7B-8. One or more elements of seat assembly 702 may be manipulated or adjusted based on one or more elements of process 900 of FIG. 9. Removable storage area 602 corresponds to storage component 210 of FIG. 2A.

Seat back 704 includes hinge assembly 208 to rotatably articulate or manipulate seat back 704 relative to seat base 204. Additionally, seat back 704 includes panel hinge assembly 710 for rotating padded panel 706 relative to seat back frame 708. Arranged below seat base 204 is storage component 210.

Figure 7B:
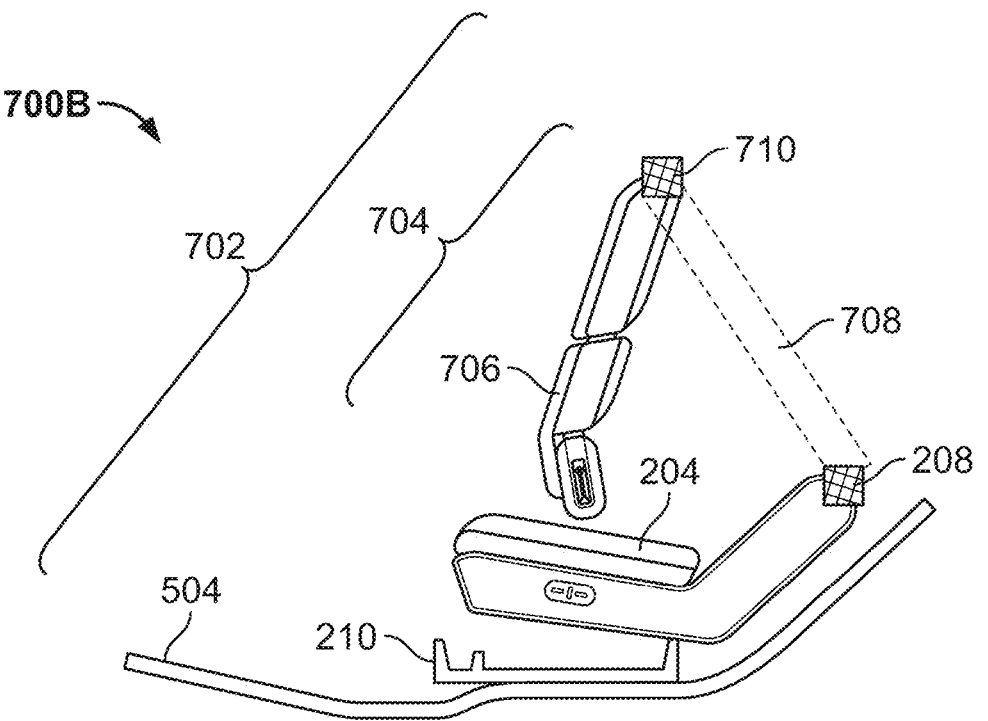
FIG. 7B illustrates the seat assembly of FIG. 7A where the seat back is being manipulated to separate a paddle panel from a seat back frame, in accordance with some embodiments of the disclosure.

FIG. 7B depicts configuration 700B of seat assembly 702 where padded panel 706 is rotated relative to seat back frame 708 via panel hinge assembly 710 away from seat back frame 708, in accordance with some embodiments of the disclosure. A bottom end of padded panel 706 is pulled away from hinge assembly 208 such that seat back frame 708 is pulled towards a horizontal orientation over seat base 204.

Figure 7C:
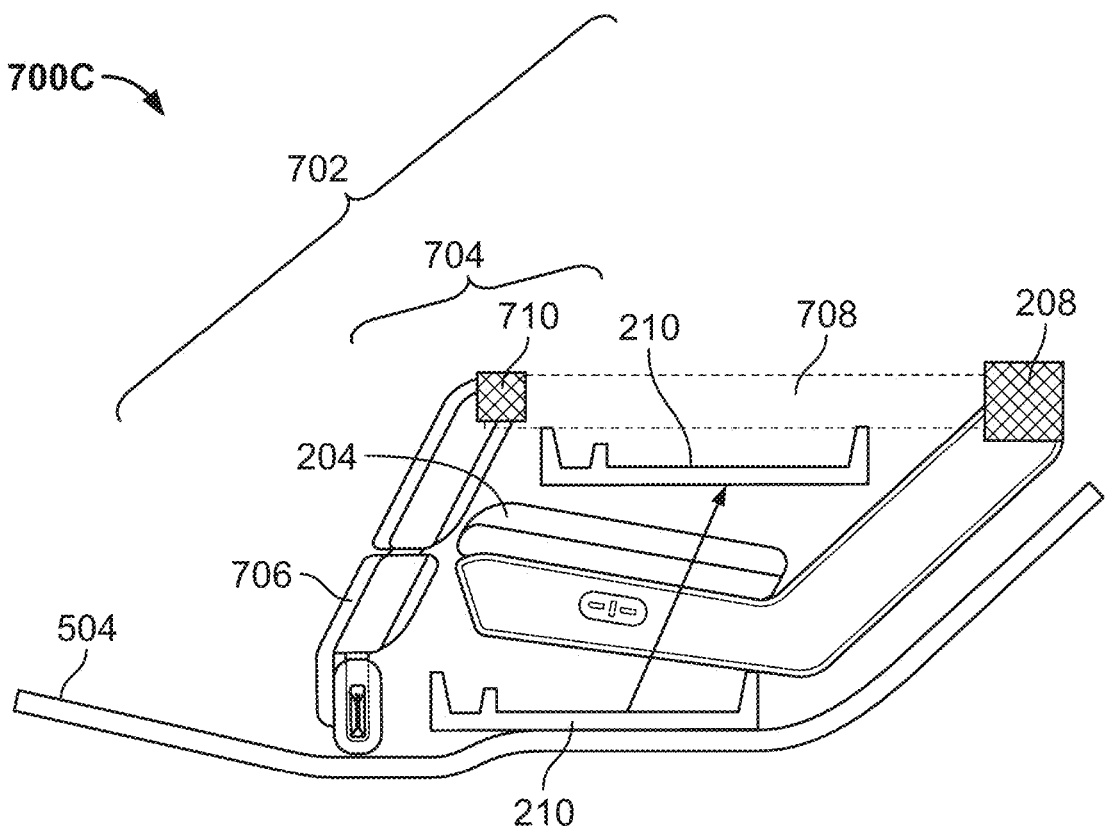
FIG. 7C illustrates a platform configuration of the seat assembly of FIG. 7A, in accordance with some embodiments of the disclosure.

FIG. 7C depicts configuration 700C of seat assembly 702, in accordance with some embodiments of the disclosure. Configuration 700C has a bottom end of padded panel 706 arrange proximate to, or contacting, occupant compartment surface 504. Additionally, storage component 210 is arranged within seat back frame 708 (e.g., by interfacing with one or more elements of an inner perimeter of seat back frame 708) after storage component 210 is removed from below seat base 204 and placed between hinge assembly 208 and panel hinge assembly 706.

Figure 8:
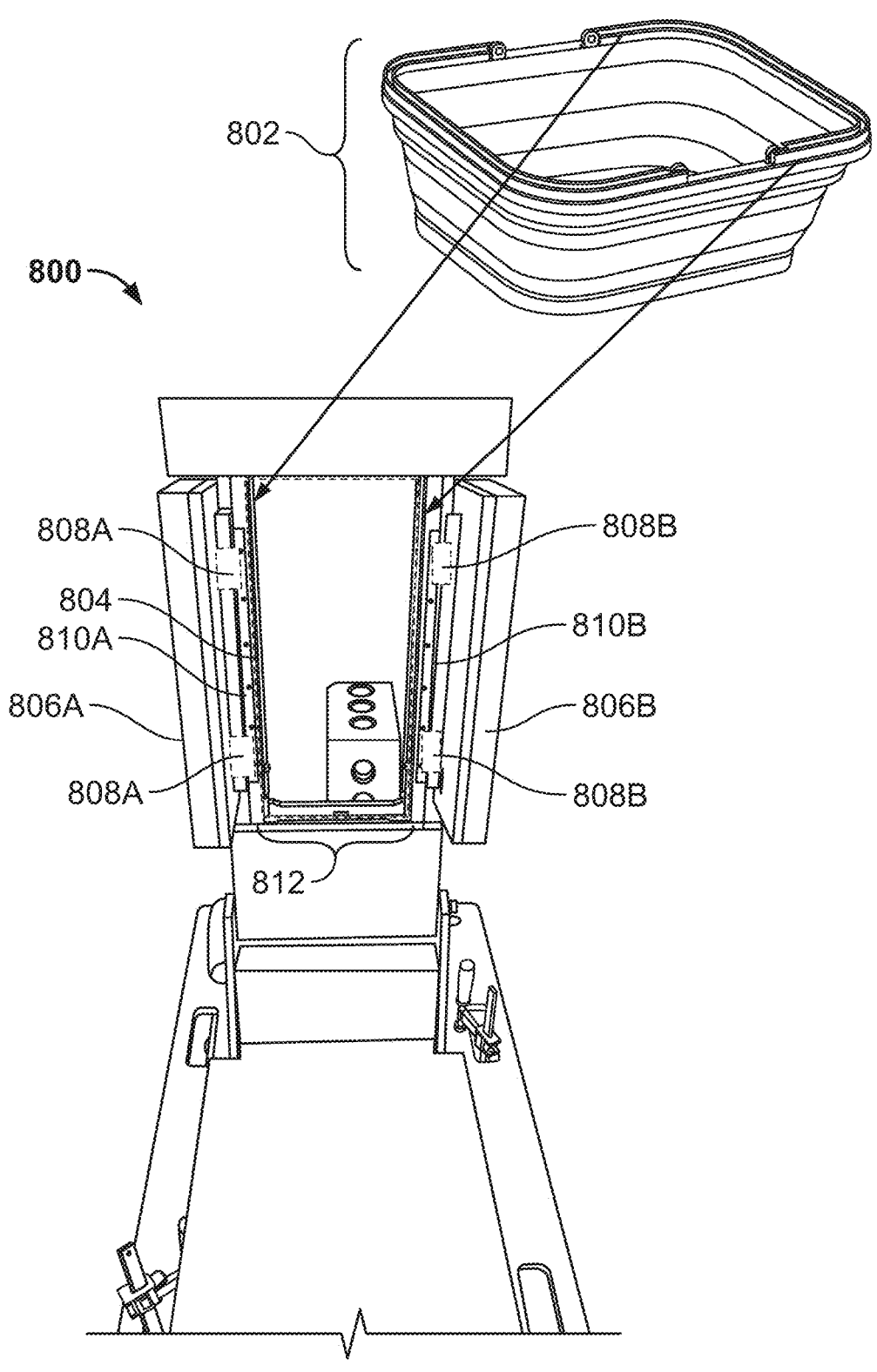
FIG. 8 illustrates a frame of a seat back of the disclosure and a removeable storage bin, in accordance with some embodiments of the disclosure.

FIG. 8 depicts frame 800 of a seat back of the disclosure and removable storage bin 802, in accordance with some embodiments of the disclosure. Frame 800 may include or incorporate any or all elements depicted in, or described in reference to, FIGS. 1A-7C. One or more elements of frame 800 may be manipulated or adjusted based on one or more elements of process 900 of FIG. 9.

Frame 800 incudes inner perimeter 804 which is configured to interface with sides of removable storage bin 802. Inner perimeter 804 is exposed when left panel 806A and right panel 806B are rotatably articulated away from inner perimeter 804 about left hinge assembly 810A and right hinge assembly 810B to expose opening 812. Opening 812 corresponds to, for example, opening 232 of FIGS. 2C and 2D. Arranged along a left side of inner perimeter 804 are left detent features 808A. Left detent features 808A may be any suitable construction or configuration to enable one or more of the various panel arrangements described in this disclosure when manipulating, or articulating, left panel 806A. Arranged along a right side of inner perimeter 804 are right detent features 808B. Right detent features 808B may be any suitable construction or configuration to enable one or more of the various panel arrangements described in this disclosure when manipulating, or articulating, right panel 806B. Although the plurality of members forming frame 800 are depicted as comprising flat surfaces, the plurality of members may also comprise a plurality of tubular members fixedly attached to ends of each other in order to enable smooth rotational articulation of one or more of left panel 806A or right panel 806B.

Figure 9:
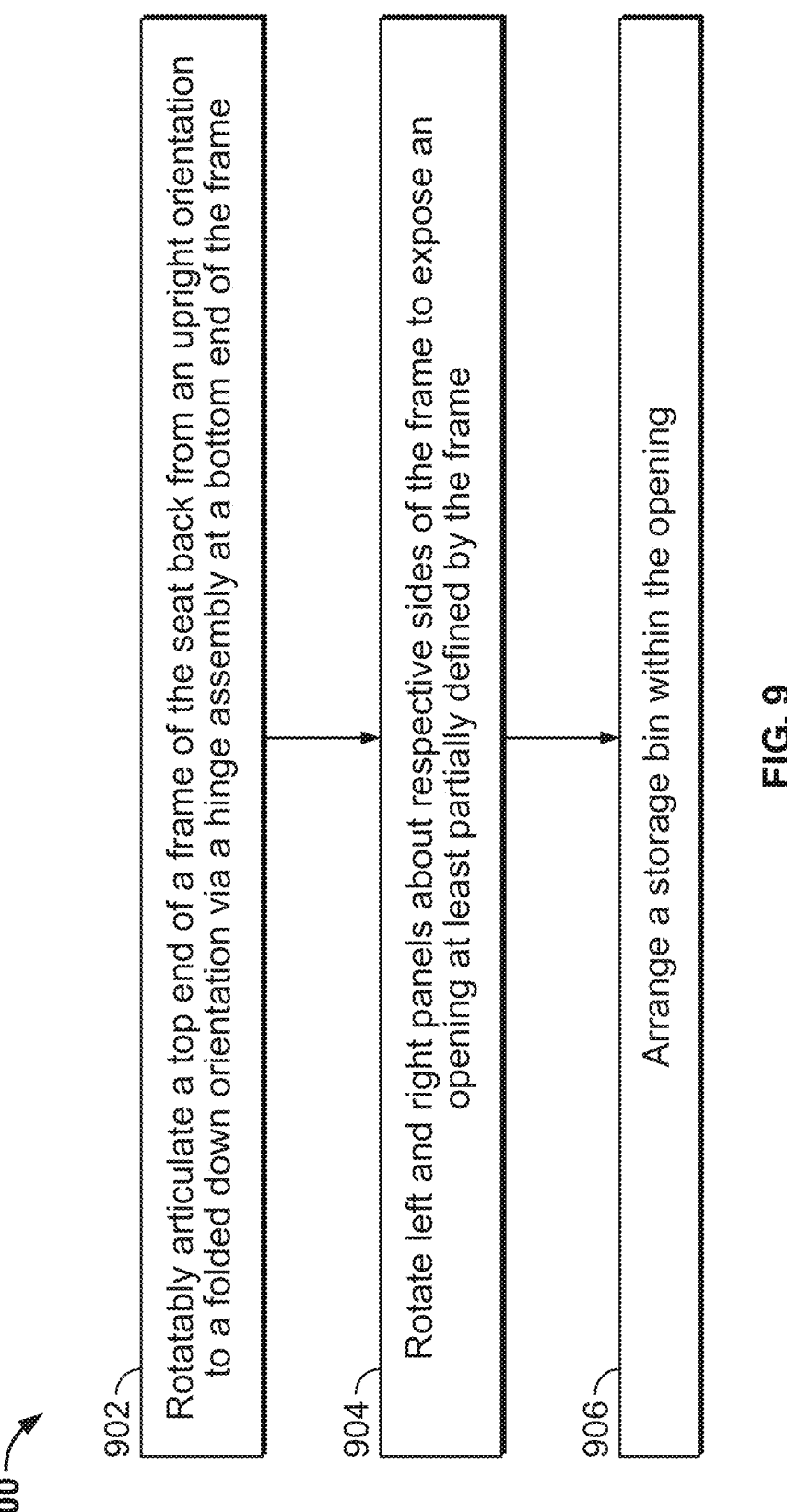
FIG. 9 is a flow chart representing an illustrative process for manipulating a transformable seatback of the disclosure, in accordance with some embodiments of the disclosure.

FIG. 9 is a flow chart representing an illustrative process for manipulating a transformable seatback of the disclosure, in accordance with some embodiments of the disclosure.

At process block 902, a top end of a frame of a seat back is rotatably articulated from an upright orientation to a folded down orientation via a hinge assembly at a bottom end of the frame (e.g., as shown in FIG. 3). At process block 904, left and right panels are rotated about respective sides of the frame to expose an opening that is at least partially defined by the frame. At process block 906, a storage bin is arranged within the opening. For example, FIGS. 1A-3 provide various examples of how the panels can be rotated and articulated relative to the frame.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems, components, and methods described herein may be performed in real time. It should also be noted that the systems, components, and/or methods described above may be applied to, or used in accordance with, other systems, components, and/or methods.

What is claimed is:

1. A seat back, comprising:

a frame rotatably coupled at one end to a seat base, wherein the frame at least partially defines an opening in the seat back; and left and right panels rotatably coupled to respective sides of the frame, wherein:

when the seat back is in a folded down position and when the left and right panels are rotated outward, the left and right panels form respective armrests.

2. The seat back of claim 1, wherein:

the frame is rotatably coupled to the seat base by a hinge assembly; and the hinge assembly is configured to enable the seat back to rotate between an upright position and a folded position where the frame is arranged horizontally above the seat base.

3. The seat back of claim 1, further comprising left and right detent features arranged along respective sides of the frame for respective left and right panels.

4. The seat back of claim 1, wherein when the left and right panels are in a closed position, the left and right panels cover the opening.

5. The seat back of claim 1, wherein when the seat back is arranged in an upright orientation and when the left and right panels are rotated outward about respective sides of the frame, the opening is exposed.

6. The seat back of claim 1, further comprising a storage bin configured to be removably coupled to a perimeter of the opening, wherein when the seat back is in the folded down position and when the left and right panels are rotated outward, the opening is capable of receiving the storage bin.

7. The seat back of claim 1, wherein when the seat back is in the folded down position and when the left and right panels are rotated outward to a second position, the left and right panels are horizontally arranged and form respective work surfaces.

8. The seat back of claim 1, further comprising a head rest rotatably coupled to a second end of the seat back arranged opposite the one end rotatably coupled to the seat base.

9. The seat back of claim 1, wherein the frame is comprised of a plurality of tubular members fixedly attached to ends of each other.

10. A vehicle assembly comprising:

a vehicle cabin; and a row of seats arranged within the vehicle cabin, the row of seats comprising at least one seat back comprising:

a frame rotatably coupled at one end to a seat base, wherein the frame at least partially defines an opening in the seat back; and left and right panels rotatably coupled to respective sides of the frame, wherein:

when the seat back is in a folded down position and when the left and right panels are rotated outward, the left and right panels form respective armrests.

11. The vehicle assembly of claim 10, wherein the row of seats comprises three seats.

12. The vehicle assembly of claim 10, wherein the at least one seat back comprises a seat belt retractor coupled to the frame.

13. The vehicle assembly of claim 10, wherein:

the frame is rotatably coupled to the seat base by a hinge assembly; and the hinge assembly is configured to enable the frame to rotate between an upright position and a folded position where the frame is arranged horizontally above the seat base.

14. The vehicle assembly of claim 10, wherein when the left and right panels are in a closed position, the left and right panels cover the opening.

15. The vehicle assembly of claim 10, wherein when the seat back is arranged in an upright orientation and when the left and right panels are rotated outward about respective sides of the frame, the opening is exposed.

16. The vehicle assembly of claim 10, further comprising a storage bin configured to be removably coupled to a perimeter of the opening, wherein when the seat back is in the folded down position and when the left and right panels are rotated outward, the opening is capable of receiving the storage bin.

17. The vehicle assembly of claim 10, wherein when the seat back is in the folded down position and when the left and right panels are rotated outward to a second position, the left and right panels are horizontally arranged and form respective work surfaces.

18. A method of transforming a seat back, the method comprising:

rotatably articulating a top end of a frame of the seat back from an upright orientation to a folded down orientation via a hinge assembly at a bottom end of the frame; and rotating left and right panels about respective sides of the frame to expose an opening at least partially defined by the frame, wherein the left and right panels form respective armrests when rotated outward to expose the opening.

* * * * *